(12) United States Patent
Hashimoto et al.

(10) Patent No.: US 10,389,165 B2
(45) Date of Patent: Aug. 20, 2019

(54) ENERGY MANAGEMENT APPARATUS, ENERGY MANAGEMENT METHOD AND PROGRAM RECORDING MEDIUM

(71) Applicant: NEC Corporation, Tokyo (JP)

(72) Inventors: Ryo Hashimoto, Tokyo (JP); Hitoshi Yano, Tokyo (JP); Hisato Sakuma, Tokyo (JP); Koji Kudo, Tokyo (JP); Alexander Viehweider, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 156 days.

(21) Appl. No.: 15/529,132

(22) PCT Filed: Nov. 18, 2015

(86) PCT No.: PCT/JP2015/005764
§ 371 (c)(1),
(2) Date: May 24, 2017

(87) PCT Pub. No.: WO2016/084347
PCT Pub. Date: Jun. 2, 2016

(65) Prior Publication Data
US 2017/0264135 A1    Sep. 14, 2017

(30) Foreign Application Priority Data
Nov. 25, 2014 (JP) ................... 2014-238052

(51) Int. Cl.
*H02J 7/00* (2006.01)
*H02J 7/04* (2006.01)
(Continued)

(52) U.S. Cl.
CPC .............. *H02J 7/041* (2013.01); *G06Q 50/06* (2013.01); *H02J 3/32* (2013.01); *H02J 7/007* (2013.01);
(Continued)

(58) Field of Classification Search
USPC .................. 320/101, 125, 128, 134
See application file for complete search history.

(56) References Cited

U.S. PATENT DOCUMENTS 7,685,310 B2 *  3/2010  Ueoka ................ H04L 43/0817
                                                      709/238
2009/0319749 A1 * 12/2009  Ogihara ................ G06F 3/061
                                                      711/170
(Continued)

FOREIGN PATENT DOCUMENTS

JP      2007-151371 A      6/2007
JP      2010-068704 A      3/2010
(Continued)

OTHER PUBLICATIONS

Written Opinion of the International Searching Authority of PCT/JP2015/005764 dated Jan. 26, 2016.
(Continued)

*Primary Examiner* — Brian Ngo
(74) *Attorney, Agent, or Firm* — Sughrue Mion, PLLC (57) ABSTRACT

An object of the present invention is to set a demand schedule for performing highly efficient demand-supply adjustment of electric power, to deal with electric power demand. To achieve the object, an energy management apparatus of the present invention is an energy management apparatus for performing demand-supply adjustment of electric power by use of a plurality of chargeable and dischargeable energy storage devices, comprising: a plan management means for acquiring a variation of a load of an electric power grid predicted during a target period; and a demand variation setting means for setting a value of an operational electric energy for charging and discharging of each of the plurality of energy storage devices to be a value corresponding to a halt state or a value between a minimum rated output and a maximum rated output, in a manner to
(Continued)

make a difference between maximum and minimum values of the load be smaller than a difference that is predicted, by operation of the plurality of energy storage devices.

10 Claims, 8 Drawing Sheets

(51) Int. Cl.
    *G06Q 50/06*     (2012.01)
    *H02J 3/32*     (2006.01)
    *H02J 9/06*     (2006.01)

(52) U.S. Cl.
    CPC ............... *H02J 9/062* (2013.01); *Y02B 10/72* (2013.01); *Y02E 40/76* (2013.01); *Y04S 10/545* (2013.01)

(56) References Cited

U.S. PATENT DOCUMENTS

| | | | | |
|---|---|---|---|---|
| 2010/0019726 A1* | 1/2010 | Kumar | ................. | B60L 3/0046 320/125 |
| 2011/0273129 A1* | 11/2011 | Coe | ........................ | H02J 7/007 320/101 |
| 2013/0253717 A1 | 9/2013 | Sakakibara et al. | | |
| 2016/0105039 A1* | 4/2016 | Jeon | ....................... | H02J 7/0065 320/128 |
| 2016/0181811 A1* | 6/2016 | Liu | .......................... | H02J 3/28 307/20 |
| 2017/0098940 A1* | 4/2017 | Syouda | ................... | G01R 31/36 |

FOREIGN PATENT DOCUMENTS

| | | |
|---|---|---|
| JP | 2012-165605 A | 8/2012 |
| JP | 2012-205490 A | 10/2012 |
| JP | 2013-102686 A | 5/2013 |
| JP | 2013-198329 A | 9/2013 |
| WO | 2012/170736 A1 | 12/2012 |
| WO | 2013/128731 A1 | 9/2013 |

OTHER PUBLICATIONS

International Search Report of PCT/JP2015/005764 dated Jan. 26, 2016.

\* cited by examiner

ENERGY MANAGEMENT APPARATUS, ENERGY MANAGEMENT METHOD AND PROGRAM RECORDING MEDIUM

CROSS REFERENCE TO RELATEED APPLICATIONS

This application is a National Stage of International Application No. PCT/JP2015/005764 filed Nov. 18, 2015, claiming priority based on Japanese Patent Application No. 2014-238052 filed Nov. 25, 2014, the contents of all of which are incorporated herein by reference in their entirety.

TECHNICAL FIELD

The present invention relates to an energy management apparatus, an energy management method and a program recording medium for setting a demand schedule of electric power.

BACKGROUND ART

For efficient use of electric power, it is desirable to match demand and supply of electric power with each other. Generally, a supply electric energy is determined in accordance with a demand forecast of electric power.

For example, as methods for determining a supply electric energy in accordance with a demand forecast of electric power, there are unit commitment which determines an economically low-cost power supply schedule by using hourly ON/OFF switching individual generators, and the like.

On the other hand, in recent years, there has been an increase of electric power generation using renewable energy, such as solar cell generation and wind power generation. In those generation methods, the power generation amount is difficult to control. In that case, it is difficult to achieve a demand-supply balance of electric power by general methods.

One of means for solving those problems is demand response which performs suppression and encouragement of electric power demand from consumers' device, by means of external signals.

In particular, stationary storage batteries expected to be widely used in the near future have a large charge/discharge power per battery, and accordingly are regarded as promising means which securely bring about an effect of demand response when charge and discharge time periods of a large number of stationary storage batteries are properly shifted.

For example, Patent Literature 1 (PTL 1) describes a direct load control system explained below. In the system, an electric power consumption rate γ=(pfut-pmin)/(pmax-pmin) is calculated for a plurality of controllable loads. Here, pfut is an average of future power consumption, pmax a maximum power consumption, and pmin a minimum power consumption. Based on the power consumption rate γ for each of the controllable loads, a grid operation apparatus produces a histogram representing distribution of a margin of increase pmax-p and a margin of decrease pmin-p in terms of change in γ. From the produced histogram, a maximization threshold value yon and a minimization threshold value γoff are calculated. Power consumption p of a controllable load is decreased to the minimum power consumption pmin of the controllable load when the power consumption rate γ of the controllable load is smaller than γoff, and on the contrary, power consumption p of the controllable load is increased to the maximum power consumption pmax when the power consumption rate γ of the controllable load is larger than yon.

For example, Patent Literature 2 (PTL 2) describes a method which assumes batteries of electric cars to be distributed electric power resources and controls electric power demand of the whole batteries by ON/OFF switching of charge (discharge) of the plurality of electric power resources.

Further, Patent Literature 3 (PTL 3) customizes a charge profile with respect to an energy storage device installed on an electric locomotive. It thereby aims at improving the operation life of the device and reducing the failure rate. However, PTL 3 aims at life improvement and failure rate reduction in an energy storage device connected to a single load, but does not perform demand-supply adjustment of electric power on a plurality of load, and does not perform demand response either.

Further, Patent Literature 4 (PTL 4) describes a storage battery management system for managing a plurality of storage battery units. The management system sets operation modes (a load follow-up mode, a life priority mode, a standby time priority mode, and the like) of the storage battery units in accordance with a purpose of use of the storage battery unit group. It weights the plurality of operation modes, thereby sets an evaluation function for evaluating a charge/discharge schedule of each of the storage battery units and, based on the evaluation function, individually determines the charge/discharge schedule of each of the storage battery units. However, PTL 4 does not perform demand response.

CITATION LIST

Patent Literature

[PTL 1] Japanese Laid-Open Patent Application No. 2010-068704
[PTL 2] Re-publication of PCT International Publication 2012/170736
[PTL 3] Japanese Laid-Open Patent Application No. 2013-102686
[PTL 4] Japanese Laid-Open Patent Application No. 2012-205490

SUMMARY OF INVENTION

Technical Problem

Inventors of the present invention considered that it is difficult to perform highly efficient suppression and promotion of electric power demand of consumers' device when ON/OFF switching of charge, discharge and switches of the device at a constant time intervals is used as a method for performing demand response.

For example, the number of magnitude patterns of charge power which can be created by charge switching (ON/OFF) of three storage batteries is at most only eight. It accordingly is difficult to achieve an appropriate demand-supply balance in response to a continuously changing electric power demand, and the ability to perform demand-supply balance stabilization, which is the essential purpose, becomes low. That is, even when having a plurality of pieces of device, the number of combinations of their ON/OFF switching is finite, and it accordingly is difficult to efficiently perform demand-supply adjustment of electric power. Further, the method of PTL 1 is alternative choice between increasing power consumption of a load to the maximum value and decreasing it to the minimum value, and there accordingly is generated unevenness in a grid load curve.

An object of the present invention is to provide an energy management system, an energy management method and a program recording medium which are capable of setting a demand schedule for performing highly efficient demand-supply adjustment of electric power to deal with electric power demand.

Solution to Problem

According to the present invention, there is provided an energy management apparatus for performing demand-supply adjustment of electric power by use of a plurality of chargeable and dischargeable energy storage devices, comprising: a plan management means for predicting a variation of a load of an electric power grid expected during a target period; and a demand variation setting means for setting a value of an operational electric energy for each of charge and discharge of each of the plurality of energy storage devices to be a value corresponding to a halt state or a value between the minimum rated output and the maximum rated output, in a manner to make a difference between maximum and minimum values of the load be smaller than a difference that is predicted, by operation of the plurality of energy storage devices.

According to the present invention, there is provided an energy management method for performing demand-supply adjustment of electric power by use of a plurality of chargeable and dischargeable energy storage devices, comprising : acquiring a variation of a load of an electric power grid expected during a target period; and setting a value of an operational electric energy for charging and discharging of each of the plurality of energy storage devices to be a value corresponding to a halt state or a value between the minimum rated output and the maximum rated output, in a manner to make a difference between maximum and minimum values of the load be smaller than a difference that is predicted, by operation of the plurality of energy storage devices.

Further, according to the present invention, there is provided a recording medium storing an energy management program for performing demand-supply adjustment of electric power by use of a plurality of chargeable and dischargeable energy storage devices, the energy management program causing a computer to realize: a function to acquire a variation of a load of an electric power grid expected during a target period; and a function to set a value of an operational electric energy for charging and discharging of each of the plurality of energy storage devices to be a value corresponding to a halt state or a value between the minimum rated output and the maximum rated output, in a manner to make a difference between maximum and minimum values of the load be smaller than a difference that is predicted, by operation of the plurality of energy storage devices.

Advantageous Effects of Invention

The present invention enables the setting of a demand schedule for performing highly efficient demand-supply adjustment of electric power to deal with electric power demand.

DESCRIPTION OF EMBODIMENTS

Hereinafter, example embodiments of the present invention will be described using drawings. Here, over all of the drawings, the same signs will be assigned to the same constituent elements, and their descriptions will be omitted if appropriate.

(First Example Embodiment)

Figure 1:
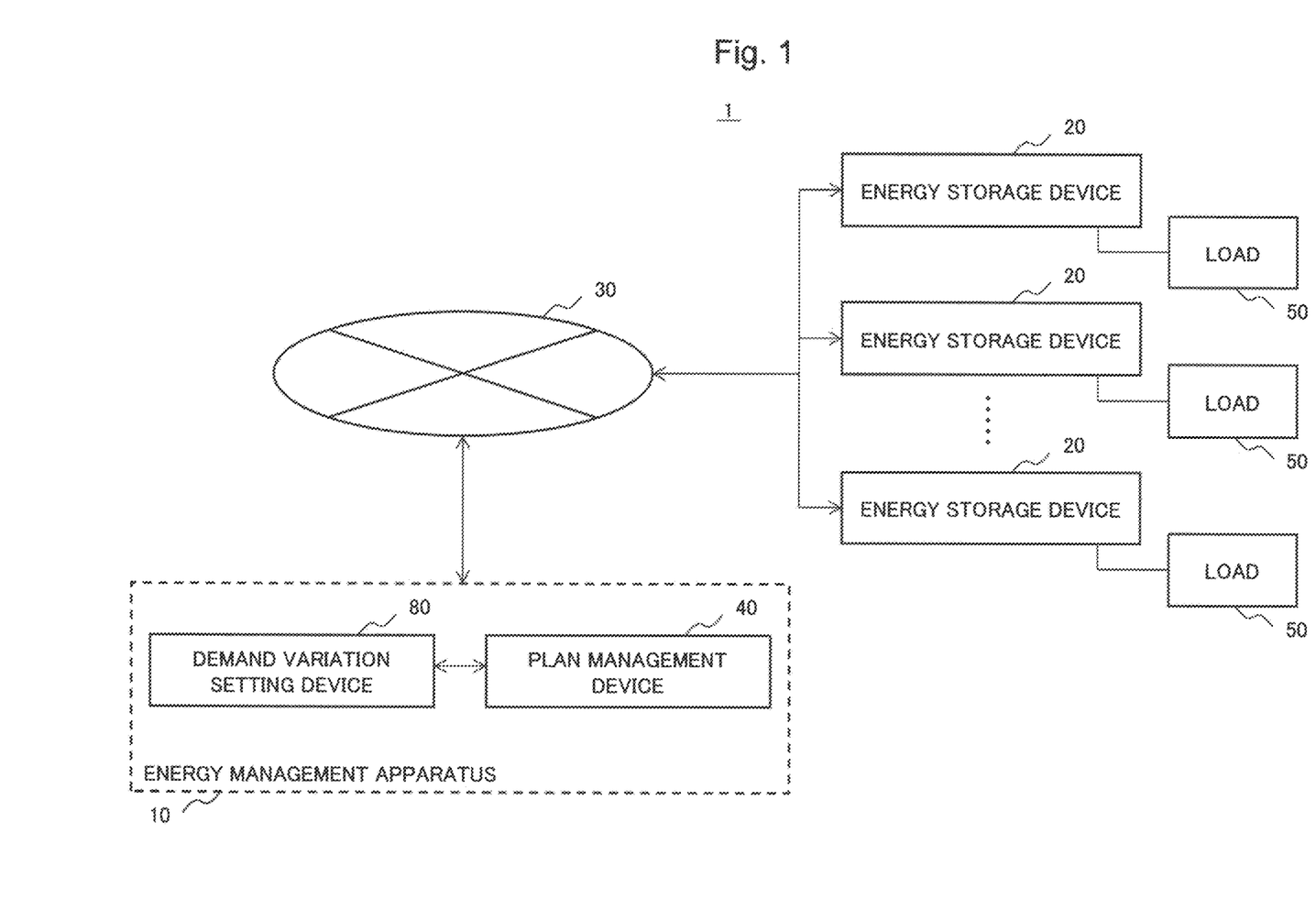
FIG. 1 is a diagram for explaining an energy control system according to a first example embodiment

FIG. 1 is a diagram for explaining a configuration of an energy management system 1 including an energy management apparatus 10 according to a first example embodiment. The energy management system 1 includes the energy management apparatus 10, a plurality of energy storage devices 20, and a communications network 30. The energy management apparatus 10 includes a demand variation setting device 80 and a plan management device 40. The energy management apparatus 10 exchanges information with the plurality of energy storage devices 20 via the communications network 30. Further, a load 50 is connected to each of the energy storage devices 20. Alternatively, the configuration may also be such that the demand variation setting device 80 and the plan management device 40 are separately arranged and exchange information with each other via the communications network 30. Further, directions of arrows in the diagram are illustrated as just examples, and shall not limit directions of signals between blocks. The same applies to the following example embodiments described below.

The energy storage devices 20 are capable of temporarily storing electric power, and are, for example, electric device and stored batteries. More specifically, the energy storage devices 20 include at least one of a stationary storage battery, a stationary storage battery of an electric car, and a computer, mobile communication terminal, power-assisted bicycle or robot provided with a rechargeable battery.

The plan management device 40 is a device used when making a plan of temporal variation of the electric energy to be supplied to an electric power network. The energy storage devices 20 connect to the electric power network. The demand variation setting device 80 is a device to be used when making an operation schedule of the energy storage devices 20. Specifically, the demand variation setting device 80 acquires a predicted grid load value, which is predicted in advance, from the plan management device 40. The predicted grid load value represents a predicted variation value of electric power demand to be consumed in the whole electric power grid during a target period of demand-supply adjustment of electric power. Here, the target period of demand-supply adjustment of electric power is, for example, a time slot within a day on which a tight demand condition is expected, a certain day on which a big demand change is expected, and the like.

Here, as the predicted grid load value, a value obtained by subtracting, from the above-described predicted variation value of electric power demand in the whole electric power grid, a predicted variation value of the electric energy generation from renewable energy, such as the amount of solar energy generation and of wind power generation, may also be used. It is because output adjustment is basically difficult in solar energy generation and wind power generation and, accordingly, even regarding the solar energy and wind power generation as a "negative demand" raises no problem when viewed from the electric power grid.

The energy management apparatus 10 makes an operation schedule of the energy storage devices 20 in a manner to increase the load during a time slot within the target period where the predicted grid load value is small and decrease the load during a time slot where the predicted value is large, and sends the operation schedule to the energy storage devices 20.

Figure 2:
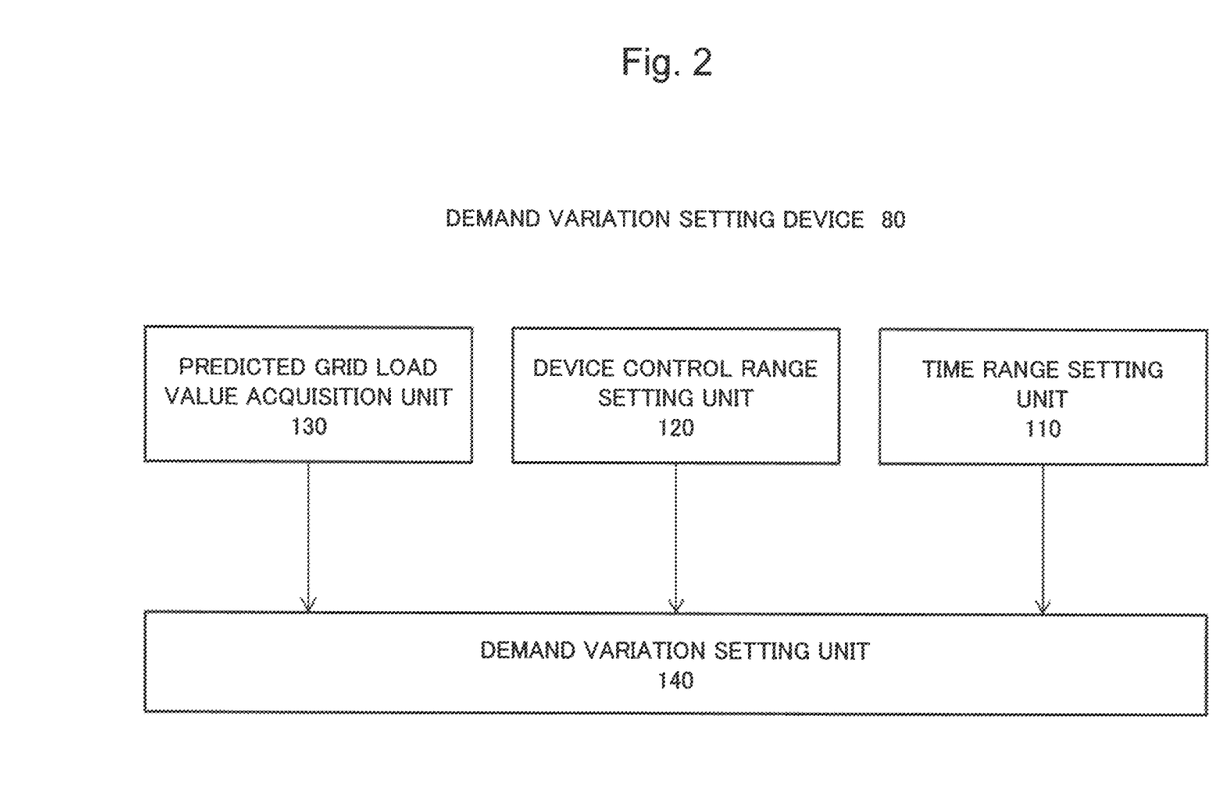
FIG. 2 is a block diagram showing a configuration of a demand variation setting device according to the first example embodiment

FIG. 2 is a block diagram showing a configuration of the demand variation setting device 80.

The demand variation setting device 80 includes a time range setting unit 110, an device control range setting unit 120, a predicted grid load value acquisition unit 130 and a demand variation setting unit 140. For each of the plurality of energy storage devices 20, the time range setting unit 110 sets an operation startable time at which operation can be started and an operation ending target time which is the latest one of times at which operation should end.

For each of the plurality of energy storage devices 20, the device control range setting unit 120 sets an energy storage amount at the operation startable time, a planned value of the energy storage amount at the operation ending target time, and a maximum energy storage amount which storage operation cannot be exceeded within the ready-to-operate period.
Further, the device control range setting unit 120 sets a minimum energy storage amount which needs to keep at all times during the ready-to-operate period, a maximum energy storage rate, a maximum energy release rate, a minimum energy storage rate and a minimum energy release rate.

The reason of keeping some energy at all times is, for example, that there is a possibility of performing unexpected discharge for an emergency or the like. It is not necessarily required to have energy remaining at any time in every one of the energy storage devices. When there is no usage requiring energy keeping at all times, the minimum energy storage amount to at least keep at all times during the ready-to-operate period becomes zero.

For example, device characteristics of the energy storage devices may be directly used as the above-described parameters, or alternatively the parameters may be alternatively set by the consumers possessing the energy storage devices 20 within the range of the device characteristics and acquired by the demand variation setting device 80. The predicted grid load value acquisition unit 130 acquires the predicted grid load value from the plan management device 40. In advance to that, the plan management device 40 acquires the above-described parameters from each of the energy storage devices 20 and further calculates the predicted grid load value.

Then, the demand variation setting unit 140 determines variation information of an operation electric energy for each of the plurality of energy storage devices 20 during the target period, in a manner to minimize the difference between maximum and minimum values of the load during the target period, by operation of the plurality of energy storage devices 20. Alternatively, instead of "minimizing" the difference between maximum and minimum values of the load predicted in the predicted grid load value, the difference may be decreased to a value smaller than the predicted difference between maximum and minimum values.

According to the energy management apparatus 10 of the present example embodiment, it becomes possible to set a schedule which causes charging and discharging of each energy storage device 20 to stop or to be performed at a value that varies continuously between the minimum and maximum ratings, such that variation of demand variation be suppressed compared to that predicted in the predicted grid load value, during the target period.

Thereby, it becomes possible to precisely adjust the amount of demanded electric power by combining a plurality of energy storage devices, and it accordingly becomes possible to perform demand-supply adjustment of electric power more effectively. When the number of combinations is limited as in the case described in Background Art, it is difficult to cope well with a continuously changing electric power demand.

In contrast, as in the present example embodiment, when energy storage devices are halted or their electric energy are changed continuously between the minimum and the maximum ratings, instead of their switching (ON/OFF), it becomes possible to cope well with electric power demand.

(Second Example Embodiment)

Figure 3:
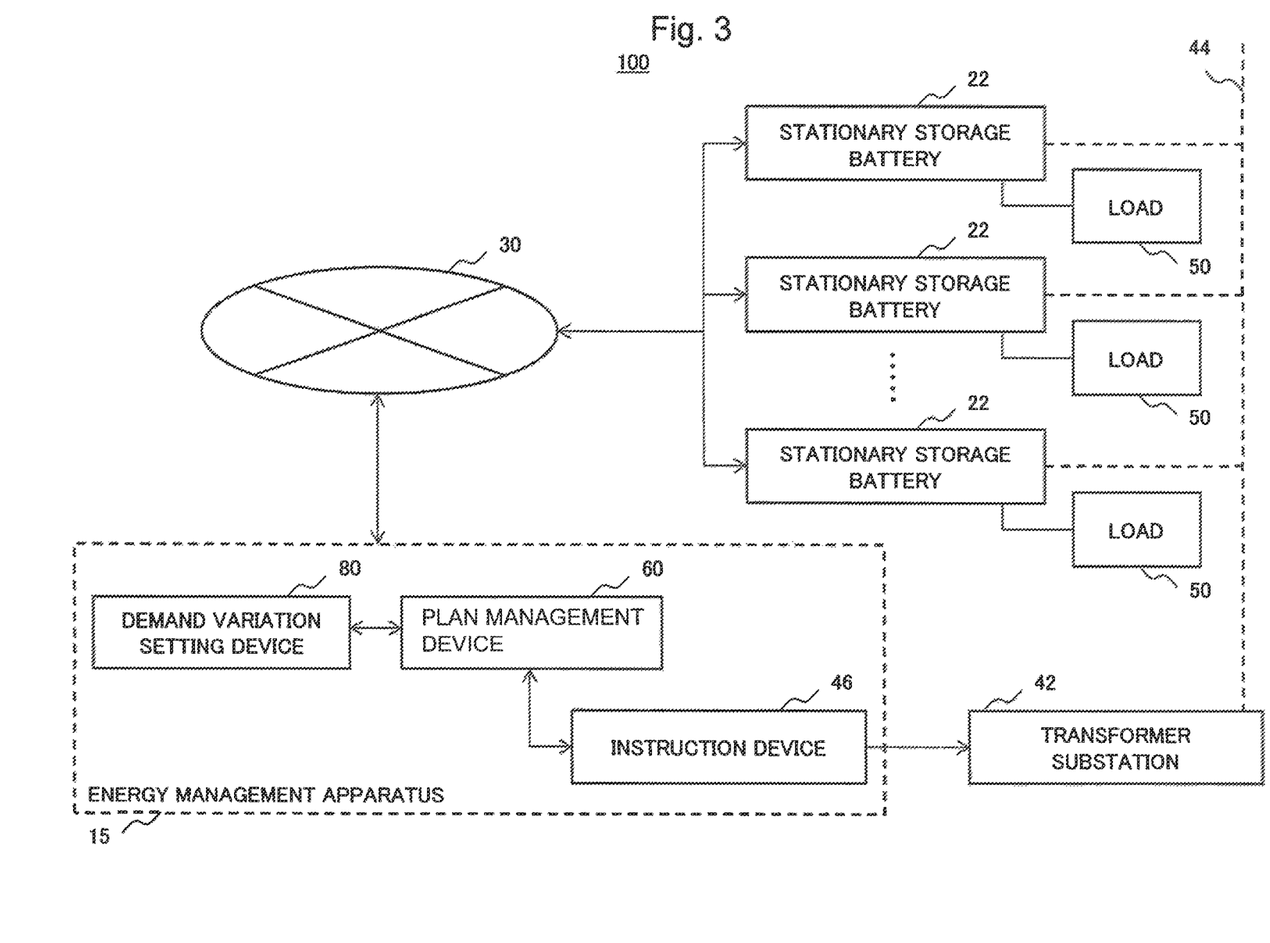
FIG. 3 is a diagram for explaining an energy control system according to a second example embodiment

FIG. 3 is a diagram for explaining a configuration of an energy management system 100 including an energy management apparatus according to a second example embodiment. As energy management apparatus 15 according to the present example embodiment is connected to a plurality of stationary storage batteries 22 via the communications network 30. The energy management apparatus 15 includes the demand variation setting device 80, a plan management device 60 and an instruction device 46. The stationary storage battery 22 is one example of the energy storage device 20 in the first example embodiment. The energy management apparatus 15 exchanges information with the plurality of stationary storage batteries 22 via the communications network 30. The stationary storage batteries 22 are connected to an electric power network 44. Electric power supplied to the electric power network 44 is controlled by a transformer substation 42. The transformer substation 42 controls the electric power supplied for the electric power network 44 in accordance with an instruction sent from the instruction device 46. An operation plan of the instruction device 46 is stored in the plan management device 60.

Alternatively, the configuration may be such that the demand variation setting device 80, the plan management device 60 and the instruction device 46 are separately arranged and exchange information with each other via the communications network 30.

Figure 4:
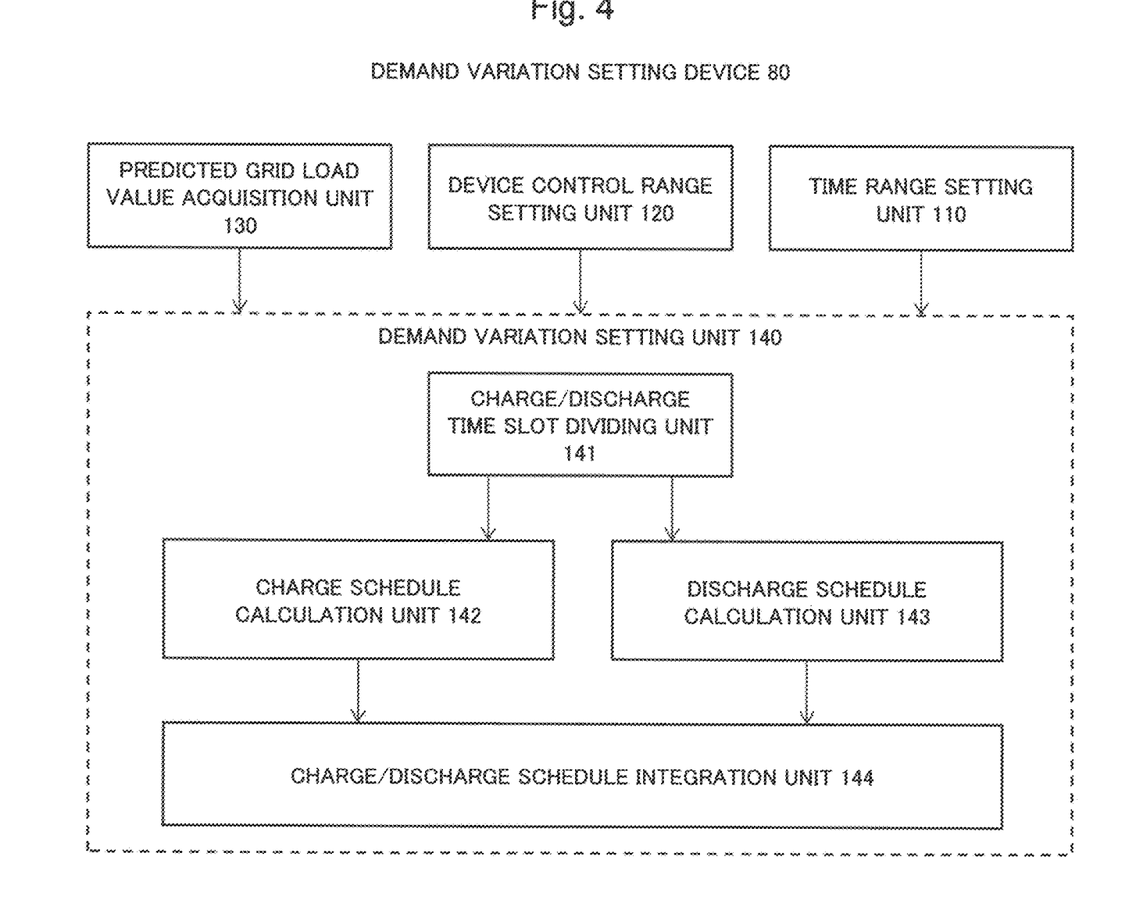
FIG. 4 is a block diagram showing a configuration of a demand variation setting device according to the second example embodiment

FIG. 4 is a block diagram showing a functional configuration of the demand variation setting device 80 according to the present example embodiment. The demand variation setting device 80 according to the present example embodiment has the same configuration as that of the demand variation setting device 80 according to the first example embodiment, except for a point described below.

First, as illustrated in FIG. 4, the demand variation setting unit 140 includes a charge/discharge time slot dividing unit 141. The charge/discharge time slot dividing unit 141 divides a target period into two time slots, that is, a discharge target time slot and a charge target time slot, based on data acquired by the predicted grid load value acquisition unit 130, the time range setting unit 110 and the device control range setting unit 120. Here, the discharge target time slot means that, in this time slot, charging is prohibited in all the stationary storage batteries 22, in other words, instructions from the demand variation setting device 80 to the stationary storage batteries 22 are limited to those for halting or discharging. The charge target time slot indicates that, in this time slot, discharging is prohibited in all the stationary storage batteries 22, in other words, instructions from the demand variation setting device 80 to the stationary storage batteries 22 are limited to those for halting or charging.

Further, the demand variation setting unit 140 has a charge schedule calculation unit 142 and a discharge schedule calculation unit 143 which schedule a charge target time slot and a discharge target time slot, respectively, for each of the stationary storage batteries.

As a schedule of each of the plurality of stationary storage batteries 22 in the charge target time slot, the charge schedule calculation unit 142 determines a halt state or a charge electric power value within the range between the minimum and maximum discharge ratings, in a manner to suppress variation of the demand variation during the target time slot as much as possible. The minimum and maximum discharge ratings mentioned above are physical quantities respectively corresponding to the minimum and maximum values of the energy storage rate which were acquired by the device control range setting unit 120.

As a schedule of each of the plurality of stationary storage batteries in the discharge target time slot, the discharge schedule calculation unit 143 determines a halt state or a discharge electric power value within the range between the minimum and maximum discharge ratings, in a manner to suppress variation of the demand variation during the target time slot as much as possible. The minimum and maximum discharge ratings mentioned above are physical quantities respectively corresponding to the minimum and maximum values of the energy release rate which were acquired by the device control range setting unit 120.

Furthermore, by combining two kinds of the schedules thus acquired respectively by the charge schedule calculation unit 142 and by the discharge schedule calculation unit 143, the charge/discharge schedule integration unit 144 determines an operation schedule of each of the stationary storage batteries 22 during the whole target period. The calculated operation schedules are sent to the respective stationary storage batteries 22.

Hereinafter, an example of a calculation method used in the charge/discharge time slot dividing unit 141 will be described. Here is assumed a single imaginary energy storage device into which a large number of energy storage devices (storage batteries, in the present example embodiment) distributed over consumers are hypothetically integrated. Specifically, an operation time range, an device control range and a predicted grid load value of the imaginary energy storage device are set by integrating characteristics of individual energy storage devices, that is, the above-mentioned operation time ranges, device control ranges and predicted grid load value. Then, by calculation using the imaginary energy storage device, a discharge target time slot and a charge target time slot are set. The imaginary energy storage device is used to enable the calculation of a mathematical programming problem, which will be described later, with high precision and at high speed.

Specifically, using a maximum energy storage amount MXWH equivalent to the difference between an energy storage amount at the operation startable time and a planned value of the energy storage amount at the operation ending target time, a maximum energy storage amount of the imaginary energy storage device, IMXWH, is set as $$IMXWH = \sum_{i}^{n} MXWH_i$$

Further, denoting a maximum energy charge rate of each storage battery by MXCKW, a maximum energy charge rate of the imaginary energy storage device (an imaginary storage battery, in the present example embodiment), IMXCKW, is set as follows. (Basically, *CKW indicates charge, and *DKW indicates discharge.)

$$IMXCKW = \frac{IMXWH}{n} \sum_{i}^{n} MXCKW_i / MXWH_i$$

Here, i represents a number assigned to each of the large number of distributed batteries, and n is the total number of the large number of distributed batteries. Similarly, a maximum energy discharge rate of the imaginary energy storage device each storage battery is calculated by denoting a maximum energy discharge rate of each storage battery by MXDKW.

$$IMXDKW = \frac{IMXWH}{n} \sum_{i}^{n} MXDKW_i / MXWH_i$$

Then, a mathematical programming problem on the assumption that the demand-supply balance is stabilized by means of the above-obtained single imaginary energy storage device is solved. Specifically, a charge/discharge task of the imaginary energy storage device at each time is expressed as follows, using an output value of the imaginary energy storage device at the time, IKWt.

$$-IMXCKW \leq IKW_t \leq IMXDKW$$

Here, IKWt=−IMXCKW means that charge at the maximum rating is performed at a time t. Similarly, IKWt=IMXDKW means that discharge at the maximum rating is performed at a time t.

Denoting a stored charge of the imaginary energy storage device at a time t by IKWHt, constraint on the stored charge of the batteries is set as follows.

$$IMXWH > IKWH_{t-1} - \Delta t \cdot IKW_t$$

$$0 < IKWH_{t-1} - \Delta t \cdot IKW_t$$

For the calculation, the target period is divided in terms of a unit time period Δt, and the divided unit time periods are numbered as 1, 2, 3, ..., t−1, t, t+1, ... Using the numbers, initial times of the respective unit time periods are referred to as time 1, time 2, ..., time t−1, time t, ...

The expression in the first row means a constraint that an energy storage amount of the imaginary energy storage device is smaller than the maximum energy storage amount IMXWH at any time. The expression in the second row means a constraint that an output value of the imaginary energy storage device at a time t is smaller than a stored charge of the imaginary energy device at a time t−1. With respect to the single imaginary energy storage device described above, a mathematical programming problem for determining IKWt in a range of next 24 hours is calculated, in a manner to satisfy $$\text{minimize} \sum_{t}^{24} (Load_t - IKW_t)^2$$

Here, Loadt is a predicted value of the load electric power at a time t, and IKWt is a charge/discharge electric power of the imaginary energy storage device at a time t.

Figure 5:
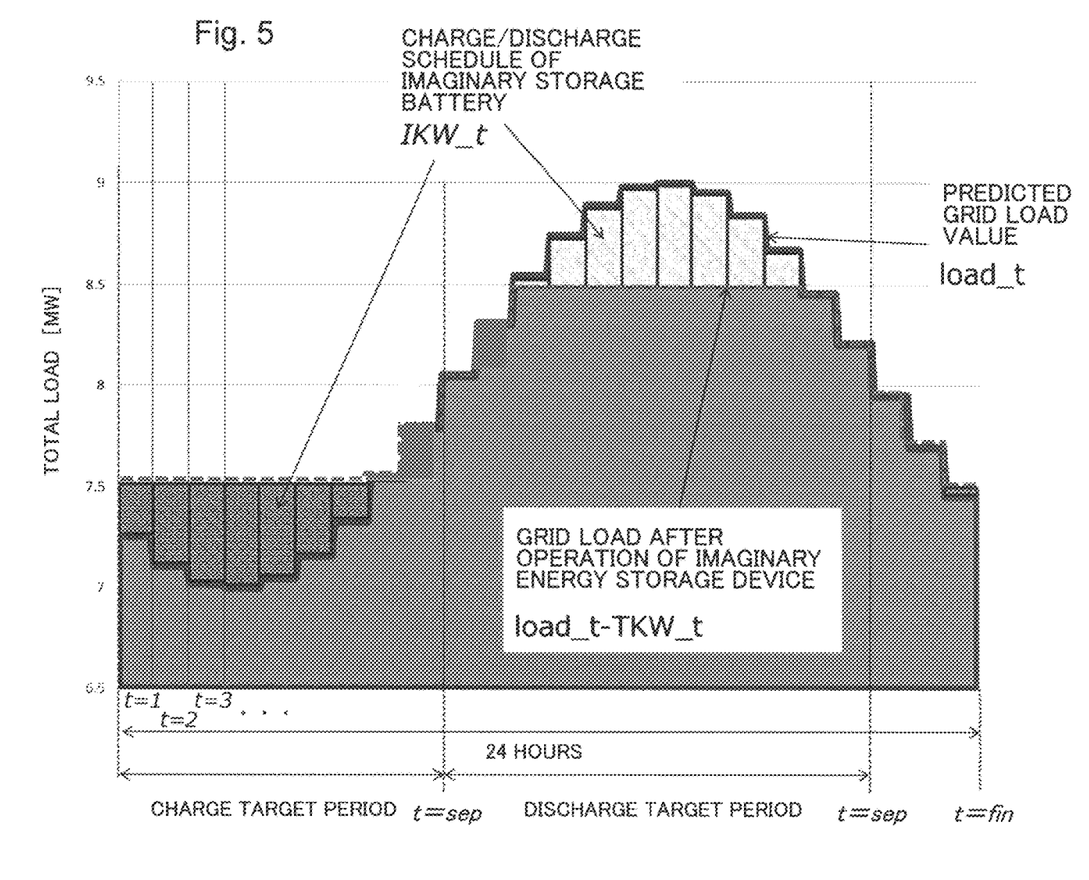
FIG. 5 is a diagram showing an example of a relationship between a charge target period, a discharge target period and operation of an imaginary energy storage device, in the second example embodiment

By performing the above-described calculation, for example, it is possible to determine a charge/discharge schedule of the imaginary energy storage device which gives a load curve during next 24 hours closest to a flat curve. FIG. 5 is a diagram schematically showing a result of the above-described calculation, where a charge/discharge schedule of the imaginary energy storage device is expressed in strips, with reference to a predicted grid load value of a certain day. According to FIG. 5, the above-described calculation determines a charge/discharge schedule in which, during the 24 hours corresponding to the target period, charge operations are performed to fill a demand dip so as to make the demand dip as flat as possible and discharge operations are performed to cut a demand peak so as to make the demand peak as flat as possible.

From the result, as illustrated in FIG. 5, a boundary is set at which the charge time and the discharge time determined in the charge/discharge schedule of the imaginary energy storage device do not overlap with each other, and the control time id divided into a time slot subjected to charge control and a time slot subjected to discharge control.

Here, the above calculation has been described for a case of "the energy storage amount at the operation startable time" =0 and "a planned value of the energy storage amount at the operation ending target time" >0, for simplification of calculation. For more general cases, the calculation is performed as follows. As the division into the charge time slot and the discharge time slot has been performed, constraint conditions are set for three kinds of time, that is, the operation startable time t=ini, the time corresponding to the boundary between the charge time slot and the discharge time slot t=sep, the operation ending target time t=fin. First, with regard to the initial time and the planned time, equality constraints are applied as follows.

An energy storage amount at the operation startable time is set to be $SWH_{i,ini}$ and a planned value of the energy storage amount at the operation ending target time is set to be $SWH_{i,fin}$ Next, with regard to the time t=sep, inequality constraints are set by the following conditions.

when the order of time slots is "charge time slot⇒discharge time slot"

$SWH_{i,sep} \geq SWH_{i,fin}$ when the order of time slots is "discharge time slot⇒charge time slot"

$SWH_{i,sep} \leq SWH_{i,fin}$

With respect to the single imaginary energy storage device with the above-described constraints applied, the above-described mathematical programming problem for determining IKWt is similarly calculated.

While the charge and discharge time slots separated from each other are calculated by the charge/discharge time slot dividing unit 141, a variety of calculation methods besides the above-described one may also be considered. For example, one method which may be considered is that of performing switching between a time slot subjected to charge control and a time slot subjected to discharge control at a time corresponding to the midpoint between times at which a maximum and a minimum of the predicted grid total load value of one day respectively occur.

Also considered is a method of estimating ideal time slots subjected respectively to charge control and to discharge control from previous experiences on the grid total load curve, by means of a method such as machine learning, or the like.

Hereinafter, an example of a calculation method used by the discharge schedule calculation unit 143 is described. Here, on processing a mathematical programming problem, two kinds of values, that is, an ON/OFF value and an output amount are used as parameters to be set for each stationary storage battery, and thereby allowing each stationary storage battery to be set to a halt state or at a value between the minimum and maximum rated outputs. ON of the ON/OFF value means causing the stationary battery to charge or discharge, and OFF means putting the battery into a halt state. With regard to the charge schedule calculation unit 142, the similar process is performed only by substituting discharge with charge, and accordingly, its description will be omitted here.

First as a discharge instruction parameter for each storage battery, $X_{i,t} = A_{i,t} \times B_{i,t}$ is set. Here, $A_{i,t} = 0$ or $1$ $MNDKW_i < B_{i,t} < MXDKW_i$ are assumed. It is also assumed here that MNDKWi is the minimum rating value of the i-th stationary storage battery, that is, the lowest discharge rate. It is also assumed that MXDKWi is the maximum rating value of the i-th stationary storage battery, that is, the maximum discharge rate. Ai,t is a parameter representing whether to send ("1") or not to send ("0") a discharge instruction to the i-th stationary storage battery at a time t, and Bi,t is a parameter meaning that, when causing the i-th stationary storage battery to discharge at a time t, discharge at an amount between the minimum and maximum ratings is instructed.

A total sum of discharge amounts of all storage batteries (the total number=n) at a time t, TKWt, is set as $$TKW_t = \sum_{i}^{n} X_{i,t}$$

Here, when the maximum stored charge of the i-th storage battery is denoted by MXWHi, and its stored charge at a time t by SWHi,t, they are set to satisfy $$MXWH_i > SWH_{i,t-1} - \Delta t \cdot X_{i,t}$$

$$0 < SWH_{i,t-1} - \Delta t \cdot X_{i,t}$$

The expression on the first row means a constraint that a stored charge of the i-th storage battery is smaller than the maximum capacity MXWH at any time during discharge. The expression on the second row means a constraint that an output value of the i-th storage battery at a time t is smaller than a capacity a stored charge of the i-th storage battery at a time t−1.

Further, a "load peak determining variable P" is defined as follows.

$$P > Load_s - TKW_s$$

Here, S represents every one of time periods {S=0, 1, 2, . . . t} defined as the discharge time slots. That is, the load peak determining variable P represents the "largest peak value" within the discharge target period.

Under the above-described conditions, a mathematical programming problem for determining Xi,t of each storage battery at each time is processed, in a manner to minimize the "largest peak value", that is, to satisfy the following.

minimize: P

Figure 6:
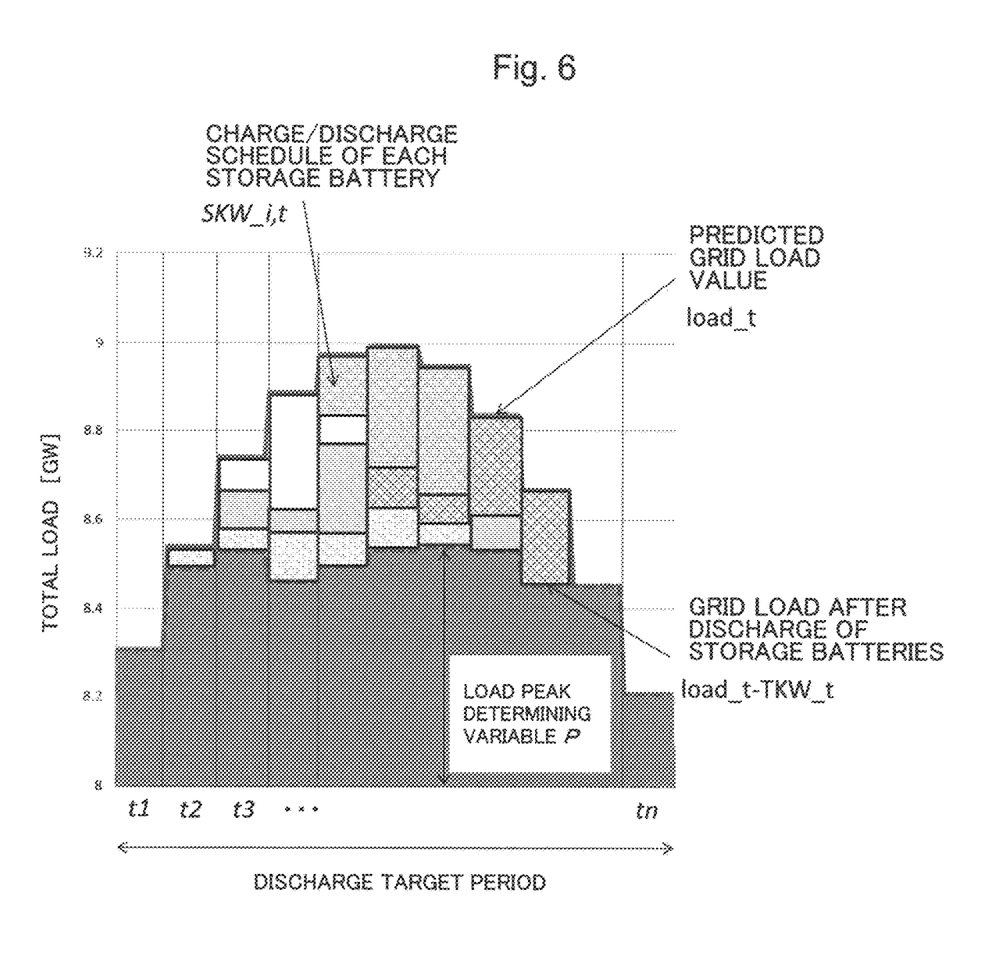
FIG. 6 is a diagram showing an example of a relationship between discharge operation of storage batteries and a grid load curve, in the second example embodiment

By performing the above-described calculation, a charge/discharge schedule of each storage battery can be determined. For example, FIG. 6 is a diagram schematically showing a result of the calculation for determining a charge/discharge schedule of each storage battery during the discharge target period. According to FIG. 6, the discharge amount of each storage battery is expressed as a rectangular block at each time, and has been assigned in a manner to minimize a maximum value of the predicted grid load value within the discharge target period. Accordingly, when the discharge schedule is executed, a grid load curve is obtained to be an almost flat curve represented by the load peak determining variable P.

Further, in the discharge schedule calculation unit 143, various constraints may be applied depending on storage battery usage styles of consumers possessing the storage batteries. For example, when the owner of the i-th stationary storage battery does not want to use the storage battery for demand response at a time t, a constraint like Xi,t=0 may be applied. Further, when an electric power of Yi,t is used for another usage at a time t simultaneously with performing demand response, constraints such as $$MXWH_i > SWH_{i,t-1} - \Delta t \cdot X_{i,t} - \Delta t \cdot Y_{i,t}$$

$$0 < SWH_{i,t-1} - \Delta t \cdot X_{i,t} - \Delta t \cdot Y_{i,t}$$

may be applied additionally. Besides the above-described ones, various ways of applying a constraint depending on storage battery usage styles of consumers may be considered.

Hereinafter, an effect of the second example embodiment will be described, as an example of demand-supply balance obtained when the present invention is used.

Here, to clearly express the efficiency of electric power demand-supply adjustment ability, an index shown below is used. That is, as a proportion of a stored charge having obviously contributed to a peak cut, out of the distributed storage batteries, (a storage battery contribution rate), storage battery contribution rate [%]=(stored charge having contributed to peak cut [Wh]/total stored charge of storage batteries [Wh])×100 is used.

Figure 7:
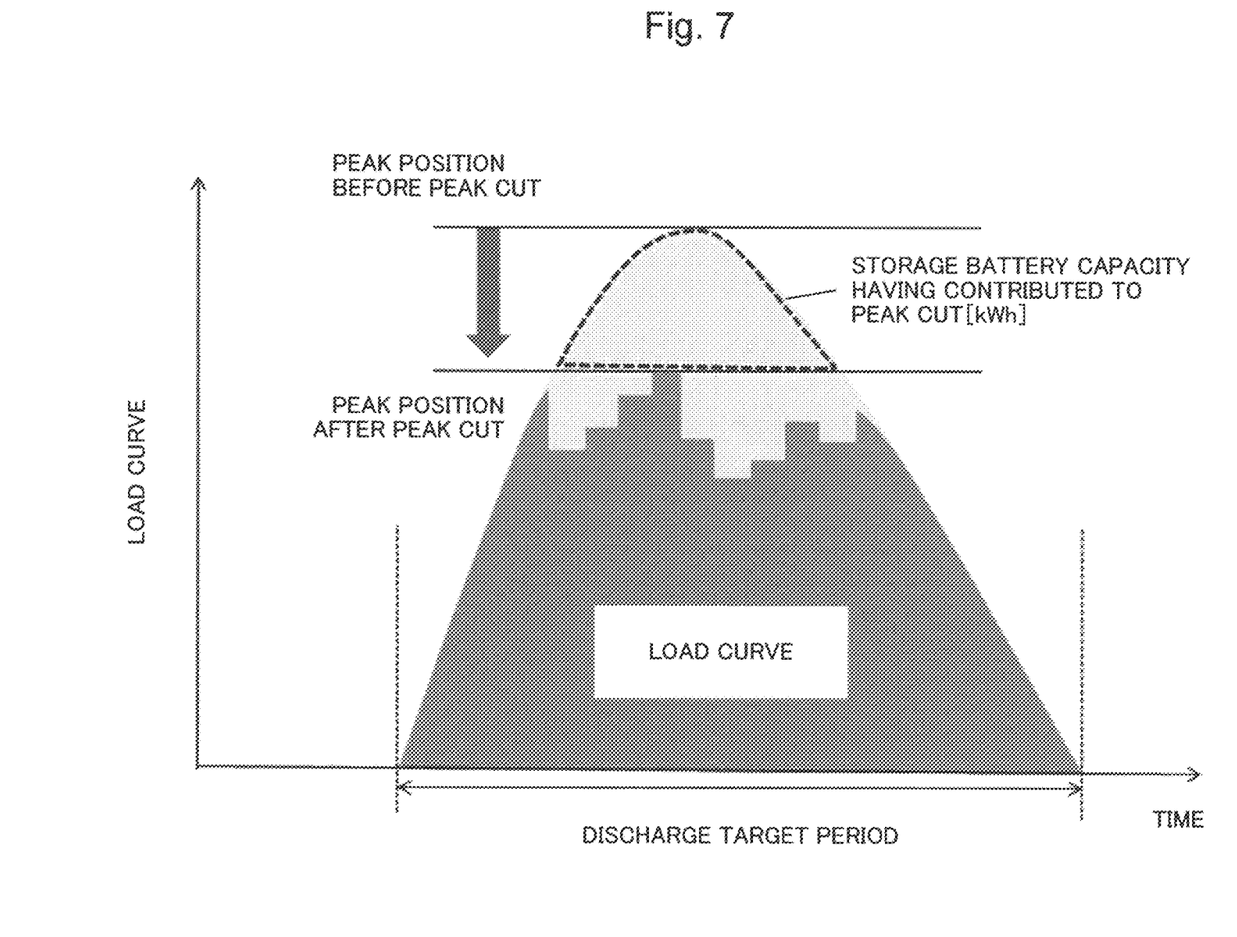
FIG. 7 is a diagram showing a stored charge having contributed to peak-cut in a discharge target period

Here, the stored charge having contributed to a peak cut represents an electric energy corresponding to a difference between a peak position before the peak cut and that after the peak cut, as shown in FIG. 7. When the contribution rate becomes 100%, it is meant that a maximum peak cut has been achieved ideally, because the whole amount of provided stored charge becomes equal to the stored charge having actually contributed to the peak cut. On the other hand, when completely no peak cut has been achieved by the whole storage batteries, the contribution rate becomes 0%.

Hereinafter, conditions of a simulation performed for the purpose of demonstrating the effect of the second example embodiment will be described.

As a load curve acquired as a next day prediction, a sine wave of 9 [MW] rating was hypothetically produced, and the predicted values were averaged over every one-hour period. Further, the stored charge of each storage battery was generated as a random number using a beta distribution and was normalized to make the total value be 3 [MWh]. That is, the total stored charge was set to be 3 [MWh] for every case of the number of storage batteries in FIG. 8 (this is the normalization described above), and under this constraint, assignment of a stored charge to each stored charge was determined according to the above-described random number.

Also for the maximum rated output, random numbers were generated using a beta distribution in which C rate ranges from 0.3 to 1.0 and has an average of 0.5 and variance of 0.04. Further, for each and every storage battery, the lowest output was assumed to be ⅓ of the maximum rated output. Here, the C rate represents the charge/discharge rate, and in the case of discharge, it is expressed as 1 C when the discharge is performed to a predetermined voltage in one hour.

Figure 8:
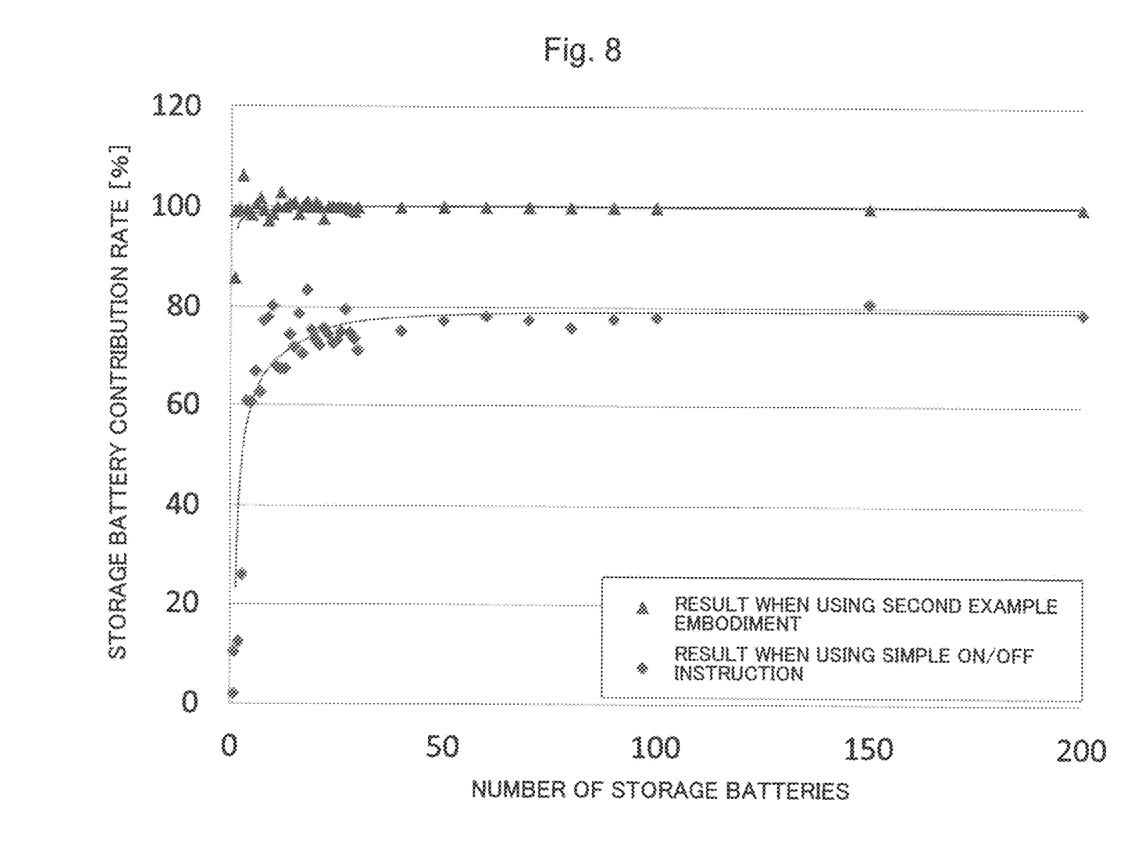
FIG. 8 is a diagram showing a calculation result on a peak-cut effect when using the second example embodiment

FIG. 8 shows a result of calculating storage battery contribution rates when the number of storage batteries was varied, under the above-described conditions. When ON/OFF was used for the control, that is, when the control was performed using only three patterns of instruction including halt, maximum rating charge and maximum rating discharge, as charge/discharge instructions sent to each storage battery, storage battery contribution rates were at most about 80%. In contrast, it was confirmed that the present invention enables to almost constantly achieve storage battery contribution rates equal to or higher than 95%.

In FIG. 8, some of the plotted contribution rates exceed 100%. This is owing to the fact that the calculations were performed with a certain error being allowed in order to increase the calculation speed. Such calculation with a slight amount of error being allowed was performed here because, in processing an optimization problem, a large amount of calculation time is required if acquirement of an exactly optimum solution is intended under stringent constraint conditions. As a result, depending on the produced storage battery parameters, there may occur a case of accidentally exceeding 100%.

Here, the meaning of the storage battery contribution rate will be described. In the present example embodiment, whether or not coping with electric power demand is well performed is evaluated by determining, whether or not a sufficient amount of peak cut is achieved. Because a peak cut is set for the objective function, the better the coping is performed, the larger the amount of peak cut is. Accordingly, viewing the "difference in demand peak between before and after using storage batteries", a parameter obtained by normalizing, with respect to the total stored charge, a necessary and sufficient electric energy to fill the difference is defined as the storage battery contribution rate.

Specifically, when the number of combinations is limited as in the case described in Background Art, it is difficult to cope with a continuously changing electric power demand, and even when optimization is performed, there is generated large unevenness in a load curve. With reference to the above-described definition of the storage battery contribution rate, it is meant that appropriate contribution is not achieved at a dip portion of the unevenness. In contrast, when consecutively changing between the minimum and maximum ratings is employed, electric power demand is well coped with, so that no (or only a little) unevenness is generated and the storage battery contribution rate becomes high. Taking FIG. 8 as an example again, the abscissa is normalized to make the total stored charge of storage batteries be 3 [MWh], and accordingly, in the case of controlling by ON/OFF, the number of combinations becomes small when the number of storage batteries is small, and the storage battery contribution rate becomes small as a result. That is, it is meant that electric power demand is not well coped with.

While functions of grid load prediction, device control range setting and time range setting have been realized using the energy management apparatus 10 in the first and second example embodiments described above, the functions may be realized by causing a general Central Processing Unit (CPU) to read a program for the realization from a recording medium.

In the second example embodiment described above, in addition to that a peak cut amount can be increased similarly to the first example embodiment, calculation of a mathematical programming problem can be simplified because the calculation is performed using an imaginary energy storage device, compared to a case of performing calculation on individual energy storage devices.

When not using an imaginary energy storage device, two kinds of calculation methods may be used. One is a method of performing optimization in the same way as above while dividing a time using another rule. For example, calculating an average from a predicted demand curve of 24 hours, division may be made at a time where the demand curve of the day has a value equal to the average. The other one is a method of optimizing a schedule of every storage battery directly without dividing a time.

While the example embodiments of the present invention have been described above with reference to the drawings, they are just examples of the present invention, and a variety of configurations may be employed, besides the above-described ones.

Part or the whole of the above-described example embodiments can be described as, but are not limited to, the following supplementary notes.

(Supplementary Note 1)

An energy management apparatus for performing demand-supply adjustment of electric power by use of a plurality of chargeable and dischargeable energy storage devices, the energy management system including:

a plan management means for acquiring a variation of a load of an electric power grid predicted during a target period; and a demand variation setting means for setting a value of an operation electric energy for charging and discharging of each of the plurality of energy storage devices to be a value corresponding to a halt state or a value between a minimum rated output and a maximum rated output, in a manner to make a difference between maximum and minimum values of the load be smaller than a difference that is predicted, by operation of the plurality of energy storage devices.

(Supplementary Note 2)

An energy management apparatus including:

a ready-to-operate period setting means for setting a ready-to-operate period for a plurality of energy storage devices capable of generation of electric power demand and electric power supply;

a control range setting means for setting a maximum energy storage amount that is an upper limit of storage during the ready-to-operate period, a minimum energy storage amount to keep for an entire length of the ready-to-operate period, a maximum energy storage rate, a maximum energy release rate, a minimum energy storage rate and a minimum energy release rate, for each of the plurality of energy storage devices;

a plan management means for acquiring a variation of a load of a whole electric power grid predicted during the ready-to-operate period; and a demand variation setting means for setting an operation electric energy of each of the plurality of energy storage devices during the target period to be a value corresponding to a halt state or a value between a lowest rated output and a maximum rated output, in a manner to make a difference between maximum and minimum values of the load be smaller than a difference predicted by the plan management means, by obtaining the predicted variation of the load of the whole electric power grid acquired and by causing the plurality of energy storage devices to charge or discharge at a rate not exceeding the maximum energy storage rate or the maximum energy release rate and not below the minimum energy storage rate or the minimum energy release rate, with the storage amount of the energy storage device not exceeding the maximum energy storage amount while keeping the minimum energy storage amount.

(Supplementary Note 3)

The energy management apparatus according to supplementary note 1 or 2, wherein the value between the lowest rated output and the maximum rated output is varied continuously.

(Supplementary Note 4)

The energy management apparatus according to any one of supplementary notes 1 to 3, further comprising:

a means for determining a discharge target time slot during which charging is prohibited in all of the plurality of energy storage devices should not charge and a charge target time slot during which discharging is prohibited in all of the plurality of energy storage devices should not discharge; and a means for determining a demand variation setting to be a halt state or a value between the lowest rated output and the maximum rated output for each of the discharge target time slot and the charge target time slot.

(Supplementary Note 5)

The energy management apparatus according to supplementary note 4, wherein:

the control range setting means further sets a planned value of the energy storage at the operation ending target time; and at a time corresponding to a boundary of shifting from the charge target time slot to the discharge target time slot, stored energy in the energy storage devices is equal to or more than the planned value of the energy storage amount at the operation ending target time, and at a time corresponding to a boundary of shifting from the discharge target time slot to the charge target time slot, stored energy in the energy storage devices is equal to or less than the planned value of the energy storage amount at the operation ending target time.

(Supplementary Note 6)

The energy management apparatus according to any one of supplementary notes 1 to 5, wherein a single imaginary energy storage device is assumed from respective characteristics of the plurality of energy storage devices, and a charge/discharge schedule of this single imaginary energy storage device is produced.

(Supplementary Note 7)

The energy management apparatus according to any one of supplementary notes 1 to 6, wherein as a setting variable for each of the plurality of energy storage devices, a product of ON/OFF and an output amount of the energy storage device is used.

(Supplementary note 8)

The energy management apparatus according to any one of supplementary notes 1 to 7, wherein variation information of the operation electric energy of each of the plurality of energy storage devices is determined by mathematical programming.

(Supplementary note 9)

The energy management apparatus according to any one of supplementary notes 1 to 8, wherein a predicted variation value of an electric energy generated from renewable energy is subtracted from the predicted transition value acquired by the plan management means.

(Supplementary Note 10)

An energy management method for performing demand-supply adjustment of electric power by use of a plurality of chargeable and dischargeable energy storage devices, comprising:

acquiring a variation of a load of an electric power grid predicted during a target period; and setting a value of an operational electric energy for charging and discharging of each of the plurality of energy storage devices to be a value corresponding to a halt state or a value between a minimum rated output and a maximum rated output, in a manner to make a difference between maximum and minimum values of the load be smaller than a difference that is predicted, by operation of the plurality of energy storage devices.

(Supplementary Note 11)

A recording medium storing an energy management program for performing demand-supply adjustment of electric power by use of a plurality of chargeable and dischargeable energy storage devices, the energy management program causing a computer to realize:

a function to acquire a variation of a load of an electric power grid predicted during a target period; and a function to set a value of an operational electric energy for charging and discharging of each of the plurality of energy storage devices to be a value corresponding to a halt state or a value between a minimum rated output and a maximum rated output, in a manner to make a difference between maximum and minimum values of the load be smaller than a difference that is predicted, by operation of the plurality of energy storage devices.

The present invention has been described above, taking the example embodiments as exemplary embodiments. However, the present invention is not limited to the above-described example embodiments. That is, to the present invention, various aspects which can be understood by those skilled in the art may be applied within the scope of the present invention.

This application is based upon and claims the benefit of priority from Japanese Patent Application No. 2014-238052, filed on Nov. 25, 2014, the disclosure of which is incorporated herein in its entirety by reference.

REFERENCE SIGNS LIST

1, 100 energy management system
10, 15 energy management apparatus
20 energy storage device
22 stationary storage battery
30 communications network
40, 60 plan management device
42 transformer substation
44 electric power network
46 instruction device
50 load
80 demand variation setting device
110 time range setting unit
120 device control range setting unit
130 predicted grid load value acquisition unit
140 demand variation setting unit
141 charge/discharge time slot dividing unit
142 charge schedule calculation unit
143 discharge schedule calculation unit
144 charge/discharge schedule integration unit

The invention claimed is:

1. An energy management apparatus that performs demand-supply adjustment of electric power by use of a plurality of chargeable and dischargeable energy storage devices, comprising:

a plan management device that acquires a variation of a load of an electric power grid predicted during a target period; and a demand variation setting device that sets a value of an operational electric energy for charging and discharging of each of the plurality of energy storage devices to be a value corresponding to a halt state or a value between a minimum rated output and a maximum rated output, in a manner to make a difference between maximum and minimum values of the load be smaller than a difference that is predicted, by operation of the plurality of energy storage devices.

2. The energy management apparatus according to claim 1, wherein the value between the lowest rated output and the maximum rated output is varied continuously.

3. The energy management apparatus according to claim 1, further comprising:

a first determining unit that determines a discharge target time slot during which charging is prohibited in all of the plurality of energy storage devices and a charge target time slot during which discharging is prohibited in all of the plurality of energy storage devices; and a second determining unit that determines a demand variation setting to be a halt state or a value between the lowest rated output and the maximum rated output for each of the discharge target time slot and the charge target time slot.

4. The energy management apparatus according to claim 1, wherein a single imaginary energy storage device is assumed from respective characteristics of the plurality of energy storage devices, and a charge/discharge schedule of this single imaginary energy storage device is produced.

5. The energy management apparatus according to claim 1, wherein, as a setting variable for each of the plurality of energy storage devices, a product of ON/OFF and an output amount of the energy storage device is used.

6. The energy management apparatus according to claim 1, wherein variation information of the operation electric energy of each of the plurality of energy storage devices is determined by mathematical programming.

7. The energy management apparatus according to claim 1, wherein a predicted variation value of an electric energy generated from renewable energy is subtracted from the predicted transition value acquired by the plan management means.

8. The energy management apparatus according to claim 3, wherein:
the control range setting means further sets a planned value of the energy storage at the operation ending target time; and
at a time corresponding to a boundary of shifting from the charge target time slot to the discharge target time slot, stored energy in the energy storage devices is equal to or more than the planned value of the energy storage amount at the operation ending target time, and at a time corresponding to a boundary of shifting from the discharge target time slot to the charge target time slot, stored energy in the energy storage devices is equal to or less than the planned value of the energy storage amount at the operation ending target time.

9. An energy management apparatus, comprising:
a ready-to-operate period setting device that sets a ready-to-operate period for a plurality of energy storage devices capable of generating electric power demand and electric power supply;
a control range setting device that sets a maximum energy storage amount that is an upper limit of storage during the ready-to-operate period, a minimum energy storage amount to keep for an entire length of the ready-to-operate period, a maximum energy storage rate, a maximum energy release rate, a minimum energy storage rate, and a minimum energy release rate, for each of the plurality of energy storage devices;
a plan management device that acquires a variation of a load of a whole electric power grid predicted during the ready-to-operate period; and
a demand variation setting device that sets an operation electric energy of each of the plurality of energy storage devices during the target period to be a value corresponding to a halt state or a value between a lowest rated output and a maximum rated output, in a manner to make a difference between maximum and minimum values of the load be smaller than a difference predicted by the plan management means, by obtaining the predicted variation of the load of the whole electric power grid acquired and by causing the plurality of energy storage devices to charge or discharge at a rate not exceeding the maximum energy storage rate or the maximum energy release rate and not below the minimum energy storage rate or the minimum energy release rate, with the storage amount of the energy storage device not exceeding the maximum energy storage amount while keeping the minimum energy storage amount.

10. An energy management method for performing demand-supply adjustment of electric power by use of a plurality of chargeable and dischargeable energy storage devices, comprising:
acquiring a variation, by a plan management device, of a load of an electric power grid predicted during a target period; and
setting a value, by a demand variation setting device, of an operational electric energy for charging and discharging of each of the plurality of energy storage devices to be a value corresponding to a halt state or a value between a minimum rated output and a maximum rated output, in a manner to make a difference between maximum and minimum values of the load be smaller than a difference that is predicted, by operation of the plurality of energy storage devices.

* * * * *

UNITED STATES PATENT AND TRADEMARK OFFICE
CERTIFICATE OF CORRECTION

PATENT NO. : 10,389,165 B2
APPLICATION NO. : 15/529132
DATED : August 20, 2019
INVENTOR(S) : Ryo Hashimoto et al.

It is certified that error appears in the above-identified patent and that said Letters Patent is hereby corrected as shown below:

In the Specification

Column 1, Line 5; Delete "RELATEED" and insert --RELATED-- therefor

Column 1, Background Art, Line 61; Delete "yon" and insert --γon-- therefor

Column 2, Background Art, Line 2; Delete "yon." and insert --γon.-- therefor

Column 12, Description of Embodiments, Line 63; Delete "determining," and insert --determining-- therefor Signed and Sealed this
Fifth Day of May, 2020

Andrei Iancu
*Director of the United States Patent and Trademark Office*